United States Patent [19]

Rostrup-Nielsen et al.

[11] Patent Number: 5,071,719
[45] Date of Patent: Dec. 10, 1991

[54] FUEL CELL POWER PLANT

[75] Inventors: Jens R. Rostrup-Nielsen, Virum; Ernst Jorn, Lyngby, both of Denmark

[73] Assignee: Haldor Topsoe A/S, Denmark

[21] Appl. No.: 606,584

[22] Filed: Oct. 31, 1990

[30] Foreign Application Priority Data

Nov. 20, 1989 [DK] Denmark .............................. 5828/89

[51] Int. Cl.⁵ .............................................. H01M 8/06
[52] U.S. Cl. ....................................... 429/19; 429/16; 429/26; 429/34
[58] Field of Search ........................ 429/19, 16, 17, 26, 429/34, 38, 39

[56] References Cited

U.S. PATENT DOCUMENTS 4,746,329 5/1988 Christner et al. .................. 429/19 X
4,751,151 6/1988 Healy et al. ............................ 429/17
4,791,033 12/1988 Patel ........................................ 429/19
4,810,595 3/1989 Kahara et al. .......................... 429/16

Primary Examiner—Anthony Skapars
Attorney, Agent, or Firm—Ostrolenk, Faber, Gerb & Soffen

[57] ABSTRACT

A fuel cell power plant utilizing hydrogen and carbon oxide rich feed gas (4) and comprising a hydrogen-carbon oxide consuming fuel cell (2) with an anode compartment (2a) and a cathode compartment (2c), means for supplying feed gas (8, 10, 12) to the anode compartment (2a), compression means (41) for supplying the cathode compartment (2c) with compressed cathode oxidant gas (44), and means for recirculating fuel cell exhaust gas (46, 50, 42) to the cathode compartment (2c), which fuel cell power plant further comprises a methanation unit (9) for converting the hydrogen and carbon-oxide rich feed gas (4) into a methanated gas, a reforming catalyst bed (13) adapted to receive and reform the methanated gas to anode process gas (14) by absorbing waste heat from said fuel cell (2).

8 Claims, 1 Drawing Sheet

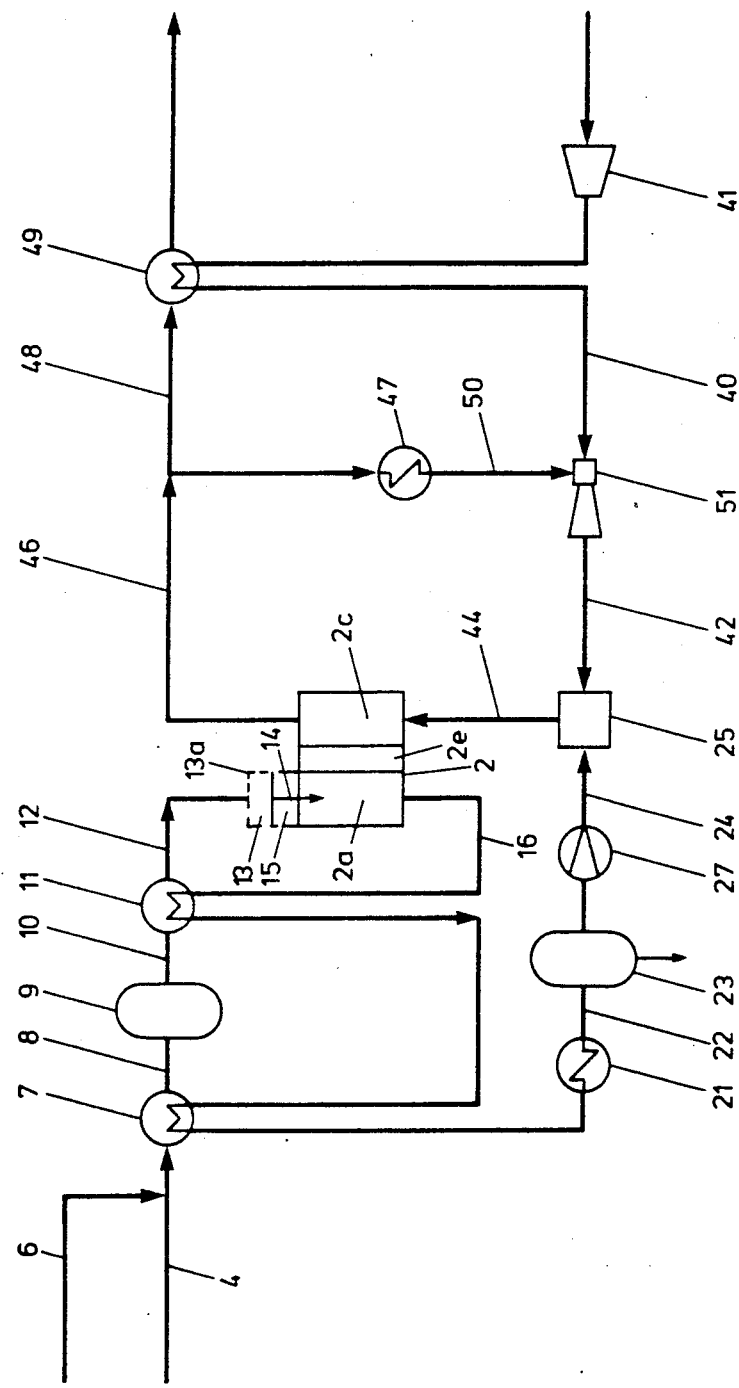

FUEL CELL POWER PLANT

FIELD OF THE INVENTION

The present invention concerns a fuel cell power plant employing hydrogen and carbon oxide rich feed gas, and in particular, an improvement of the overall efficiency of such a fuel cell power plant by reducing the demand of cooling the fuel cell of the plant.

BACKGROUND OF THE INVENTION

In a fuel cell power plant chemical energy contained in the feed gas is converted into electrical energy by electrochemical reactions in the fuel cell. The feed gas is electrochemically oxidized at the anode of the fuel cell to give up electrons, which are combined with oxidant reactant gas in the cathode of the cell. Typical fuel cells widely employed in the known fuel cell power plants operates on hydrogen-carbon oxide fuel and air oxidant. Such a fuel cell is the known molten carbonate fuel cell and the solid oxide fuel cell, wherein $H_2$-$O_2$-fuel contained in the feed gas and the cathode oxidant gas is converted into water by the electrochemical reactions.

When using a molten carbonate fuel cell $CO_2$ is required in the cathode to maintain an appropriate ion transport through an electrolyte matrix, which is in contact with the anode and the cathode. $CO_2$ is produced at the anode according to the following reactions:

$$H_2 + CO_3^{2-} \rightarrow H_2O + CO_2 + 2e \quad (1)$$

$$CO + CO_3^{2-} \rightarrow 2\,CO_2 + 2e^- \quad (2)$$

and consumed at the cathode by the reaction:

$$\tfrac{1}{2}O_2 + CO_2 + 2e^- \rightarrow CO_3^{2-} \quad (3)$$

The theoretical thermal efficiency of a $H_2$-$O_2$ fuel cell is determined by the ratio of free energy and heat of reaction of the overall cell reaction.

$$H_2 + \tfrac{1}{2}O_2 \rightarrow H_2O;\ \Delta H = -241{,}8\ kJ/mole \quad (4)$$

Though the free energy of the oxidation of $H_2$ and CO decreases with an increase in temperature, giving a decreased reversible voltage of the cell, the performance of a practical fuel cell is kinetically controlled and benefits from a temperature increase. Mechanical properties and constraints of the materials used in the cell components, however, limit the operating temperature of the cells to a rather narrow temperature interval in order to avoid structural stress of the electrode material or electrolyte degradation, caused by sintering or crystallization of the electrolyte matrix. The operating temperature of e.g. a conventional molten carbonate fuel cell is confined within the range of 600°-700° C. Thus surplus of heat generated by the exothermic electrochemical processes and polarization loss in the cell has to be removed from the cell.

Cooling of the fuel cells, which in a fuel cell power plant are piled up to a stack of many individual cells, is provided by heat exchanging plates, or channels with a stream of a coolant to keep the stack at its optimum operating temperature. In the known fuel cell power plants cathode oxidant gas is used as coolant in the stack. Hot cathode exhaust gas is cooled and mixed with air along with $CO_2$ from anode exhaust gas before it is recycled to the cathode compartment. The flow of the mixed recycle gas is adjusted at an appropriate rate depending on the cooling demand of the fuel cell stack in order to provide sufficient cooling.

A drawback of the known fuel cell power plants using coal gas or hydrogen-carbon oxide rich gases as feed is the high cooling demand of the fuel cell stack caused by the strongly exothermic conversion reactions in the fuel cells.

In particular, the recycle and gas supply system of the cathode gas loop has to be designed for a high gas flow to meet the cooling demand resulting in piping with considerable sectional areas and large compression units with high energy consumption for providing a sufficient gas flow.

It is an object of the present invention to provide a fuel cell power plant employing hydrogen and carbon oxide rich gases as feed and having an improved overall efficiency by reducing the demand of cooling the fuel cell of the plant.

It is further an object of the present invention to simplify the cathode gas supply loop of such a fuel cell power plant.

SUMMARY OF THE INVENTION

In accordance with the present invention there is provided a fuel cell power plant utilizing hydrogen and carbon oxide rich feed gas and comprising a hydrogen-carbon oxide consuming fuel cell with an anode compartment and a cathode compartment, means for supplying fuel gas to the anode compartment, compression means for supplying the cathode compartment of said fuel cell with compressed cathode oxidant gas, and means for recirculating fuel cell exhaust gas, said fuel cell power plant further comprises a methanation unit for converting the hydrogen and carbon oxide rich gas to a gas rich in methane, and means for reforming the methane rich gas, which means is adapted to absorb waste heat from said fuel cell by converting said methane rich gas to anode process gas.

The methanation unit may comprise any of the known methanation reactors, such as an adiabatic methanation reactor and a boiling water methanation reactor.

When using an adiabatic methanation reactor it is advantageous to connect a series of such reactors with recycling of processed gas to one or more of the reactors, as mentioned in e.g. U.S. Pat. No. 4,130,575.

In a preferred embodiment of the invention the methanation-reaction is carried out in an adiabatic reactor connected to a boiling water methanation reactor, as disclosed in U.S. Pat. No. 4,298,694, which is incorporated herein by reference. Thereby waste heat generated during the exothermic methanation process is utilized to produce superheated steam, which may be used for generating additional electricity in a steam turbine.

Methane rich gas from the methanation unit is converted to the hydrogen rich anode process gas by endothermic steam reforming in a reforming catalyst bed. By arranging the reforming catalyst bed in heat conducting relationship with the fuel cell necessary heat for the endothermic reforming process is supplied by the waste heat, which is generated during the exothermic electrochemical reactions in the fuel cell.

In still a preferred embodiment of the invention the reforming catalyst bed is an integrated part of the fuel cell, such as in the known internal reforming molten carbonate fuel cell.

In general the demand of cooling the fuel cell of a power plant according to the invention is reduced by consuming heat of reaction contained in the hydrogen-carbon oxide feed gas in a methanation unit and by absorbing waste heat from the fuel cell in a reforming catalyst bed by the endothermic steam reforming process. As a result the cathode gas supply loop of the fuel cell power plant according to the invention can be simplified in terms of diminished proportion of piping and reduced compression work for circulating cathode gas.

Waste heat removal is thereby advantageously moved from the cathode gas loop as in the known hydrogen-carbon oxide feed employing fuel cell power plants to the methanation unit, which further results in an improved steam production due to a high gas pressure and resulting higher heat transfer coefficients in the methanation unit as compared to the corresponding parameters in the cathode gas loop.

Furthermore, as an advantageous feature of the invention hot cathode exhaust gas may be circulated by means of an ejector, thereby saving costs for expensive hot gas compressors.

BRIEF DESCRIPTION OF THE DRAWING

In the accompanying drawing the single Figure is a schematic flow diagram illustrating the above features and aspects of the invention. The Figure is simplified and conventional parts of a fuel cell power plant, such as the bottoming cycle, steam turbines and other installations, are not shown in the Figure.

DETAILED DESCRIPTION OF THE INVENTION

Referring now to the Figure the fuel cell power plant according to one embodiment of the invention comprises a hydrogen consuming fuel cell 2 with an anode compartment 2a and a cathode compartment 2c held in contact by an electrolyte matrix 2e. As used herein and discussed above the fuel cell comprises a stack of several individual cells provided with heat exchanging plates (not shown in the Figure) for cooling the stack.

Anode process gas supplied on line 14 is prepared by passing hydrogen and carbon oxide-feed gas in line 4 along with steam supplied on line 6 successively through a methanation unit 9 and a reformer unit 13a. Before passing the combined stream of feed gas and steam to methanation unit 9 the stream is adjusted to a temperature of about 350° C. by heat exchange with anode exhaust gas 16 in heat exchanger 7 arranged in line 8.

In methanation unit 9 hydrogen and carbon oxides contained in the combined stream of feed gas and steam, are methanated in the presence of a methanation catalyst by the following reactions:

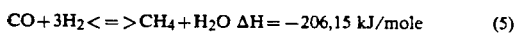

$$CO + 3H_2 <=> CH_4 + H_2O \quad \Delta H = -206{,}15 \text{ kJ/mole} \quad (5)$$

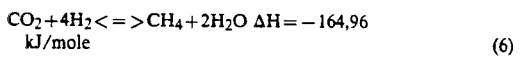

$$CO_2 + 4H_2 <=> CH_4 + 2H_2O \quad \Delta H = -164{,}96 \text{ kJ/mole} \quad (6)$$

Waste heat, which is formed during the strongly exothermic methanation reactions (5) and (6), may thereby be used to produce steam. As mentioned above, methanation unit 9 may comprise an adiabatic methanation reactor and connected thereto a boiling water methanation reactor wherein superheated steam is produced during the methanation process.

The methanated gas leaving methanation unit 9 at a temperature of about 350° C. through line 10, consists mainly of methane, carbon dioxide and steam. The gas is preheated in heat exchanger 11 to a temperature of about 600° C. with hot exhaust gas in line 16 from anode compartment 2a.

The preheated gas is then passed in line 12 to reformer unit 13a, containing reforming catalyst 13. The reforming catalyst 13 is in heat conducting relationship with the fuel cell 2 by heat conducting separator plate 15.

As mentioned above the reforming reactions and the electrochemical oxidation reactions may be integrated in the fuel cell (not shown in the Figure), such as by the known internal-reforming molten carbonate fuel cell. Thereby the need for an external reforming unit 13a is eliminated.

In the reformer unit 13a methane and steam contained in the preheated gas, are reformed to anode process gas, supplied on line 14 to the anode compartment 2a, in the presence of reforming catalyst 13 by the reaction:

$$CH_4 + H_2O <=> 3H_2 + CO \quad \Delta H = +206{,}15 \text{ kJ/mole} \quad (7)$$

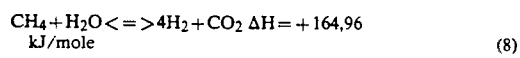

$$CH_4 + H_2O <=> 4H_2 + CO_2 \quad \Delta H = +164{,}96 \text{ kJ/mole} \quad (8)$$

Necessary heat for the endothermic steam reforming reaction (7) and (8) is thereby provided in fuel cell 2 by the exothermic electrochemical reaction (4) of the anode process gas with cathode oxidant gas supplied on line 44.

The anode process gas flows at a temperature of about 650° C. through the anode compartment 2a and is electrochemical reacted resulting in anode exhaust gas of mainly carbon dioxide and water along with minor amounts of unused hydrogen, carbon monoxide and methane, which leaves the anode compartment 2a through line 16.

The anode exhaust gas in line 16 is cooled in heat exchangers 11 and 7 as described above and further cooled by cooling unit 21. The main part of water contained in the cooled exhaust gas 22 is removed in drain separator 23. The dried exhaust gas 24 is then compressed in blower 27 and passed to combustion unit 25. In combustion unit 25 unused hydrogen, carbon monoxide and methane contained in the dried exhaust gas 24 is combusted to carbon dioxide and water, mixed with a mixture of cathode recycle gas and compressed air passed on line 42 to the combustion unit as further described below.

Cathode oxidant gas, consisting mainly of air and carbon dioxide is prepared by mixing exhaust gas leaving the cathode compartment 2c through line 46 with compressed air on line 40 and combining the gas mixture with combusted anode exhaust gas in combustion unit 25. A part of the cathode exhaust gas is thereby circulated in recycle line 50 after cooling in waste heat boiler 47 arranged in line 50.

The cathode exhaust gas in line 50 is circulated by means of ejector 51, which is driven by compressed air supplied on line 40 and compressed by compression unit 41. Before mixing with cathode exhaust gas with air in ejector 51, the air is preheated by heat exchange in heat exchanger 49 with the residue of the cathode exhaust gas in line 48.

The mixed gas in line 42 is then combined with combusted anode exhaust gas in combustion unit 25. The cathode oxidant gas thus obtained is passed in line 44 to the cathode compartment 2c, where it is reacted with electrons formed during the electrochemical reaction in the anode compartment 2a.

Cooling of the fuel cell 2 is obtained by adjusting the temperature of the oxidant gas passed in line 44 to e.g. about 570° C., which is lower than the operating temperature (650° C.) of the fuel cell 2. The stream of oxidant gas has further to be adjusted to a flow rate at which a sufficient transport of waste heat out of the fuel cell 2 is ensured. The flow of the cathode oxidant gas 44 is adjusted by regulating the recycle flow of cathode exhaust gas in line 50, which is controlled by ejector 51 and by the compressed air 42 according to the known principles of an ejectorpump.

Waste heat is as mentioned above mainly absorbed by the reforming process, the residue is removed by the stream of cathode oxidant gas and hot cathode exhaust gas in line 46 and 48.

In the following computation model shown in the Examples below the performance of a fuel cell power plant provided with a methanation unit and internal reforming molten carbonate fuel cell according to a preferred embodiment of the invention (Example 2) will be compared with a conventional fuel cell power plant (Example 1).

For the purpose of comparison the following process parameters are assumed to be the same in both cases.

The feed gas to the power plant is a hydrogen and carbon oxide rich gas having the following composition in mole %:

| | |
|---|---|
| $H_2$ | 33,6 |
| $N_2$ | 0,1 |
| $CO$ | 50,3 |
| $CO_2$ | 15,9 |
| $CH_4$ | 0,1 |

The fuel cell comprises a stack of 300 individual internal reforming molten carbonate fuel cells, which operate at a temperature of 650°, giving a net power output of 105 kW.

EXAMPLE 1

In this Example a stream of hydrogen-carbon oxide feed gas combined with steam is directly passed through line 14 to the anode compartment 2a of the fuel cell 2 and converted to electricity as described above. Cooling of the fuel cell is provided by cathode oxidant gas supplied on line 44, which is prepared by combining a mixture of compressed air in line 40 and cathode recycle gas 50 with dry anode exhaust gas in line 24, burnt in combustion unit 25.

Relevant process parameters and gas compositions will be apparent from Table 1 below, in which the position numbers refer to the lines and units shown in the Figure.

TABLE 1

| Composition Mole % | Pos. No. | | | | | | | | | |
|---|---|---|---|---|---|---|---|---|---|---|
| | 14 | 16 | 24 | 40 | 41 | 50 | 42 | 44 | 46 | 47 |
| H2 | 19.10 | 5.41 | 8.41 | 0.00 | | 0.00 | 0.00 | 0.00 | 0.00 | |
| H2O | 43.24 | 40.52 | 7.42 | 1.90 | | 9.09 | 8.24 | 8.74 | 9.09 | |
| N2 | 0.06 | 0.04 | 0.07 | 76.56 | | 65.19 | 66.54 | 62.70 | 65.19 | |
| CO | 28.51 | 3.39 | 5.27 | 0.00 | | 0.00 | 0.00 | 0.00 | 0.00 | |
| CO2 | 9.03 | 50.65 | 78.83 | 0.03 | | 20.34 | 17.93 | 22.11 | 20.34 | |
| CH4 | 0.06 | 0.00 | 0.00 | 0.00 | | 0.00 | 0.00 | 0.00 | 0.00 | |
| O2 | 0.00 | 0.00 | 0.00 | 20.59 | | 4.60 | 6.50 | 5.69 | 4.60 | |
| AR | 0.00 | 0.00 | 0.00 | 0.92 | | 0.78 | 0.80 | 0.75 | 0.78 | |
| Temp. Deg. C. | 600.00 | 650.00 | 50.73 | 330.00 | | 570.00 | 545.96 | 570.14 | 650.00 | |
| Pres. Bar g | 0.01 | 0.01 | 0.03 | 0.20 | | 0.01 | 0.02 | 0.02 | 0.01 | |
| Flow Nm3/h | 159. | 216. | 139. | 250. | | 1856. | 2105. | 2235. | 2149. | |
| Duty kcal/h | | | | | | | | | | 58453 |
| Power W | | | | 4200 | | | | | | |

EXAMPLE 2

This example illustrates the improvement of the overall efficiency of a hydrogen-carbon oxide employing fuel cell power plant according to a preferred embodiment of the invention compared to the conventional fuel cell power plant of Example 1.

Feed gas combined with steam is supplied on line 8 and converted to a gas rich in methane by methanation of hydrogen and carbon oxide in methanation unit 9. The methanated gas from the methanation unit is passed in line 12 to the anode compartment 2a, where it is reconverted to anode process gas by contact with an internal reforming catalyst arranged in the fuel cell 2 and by utilizing waste heat from the fuel cell. As seen in Table 2 below the feed gas in line 8 of this Example has the same composition as the feed gas 14 of Example 1, which in Example 1 is passed directly to the anode compartment 2a.

By utilizing waste heat from the electrochemical reactions to the heat consuming reforming reaction the flow rate in the cathode gas loop 50, 42, 44, 46 is appreciably reduced compared to the cathode gas loop of Example 1.

Relevant process parameters and gas compositions will be apparent from the Table 2 below, in which the position numbers refer to the lines and units shown in the drawing.

TABLE 2

| Composition Mole % | Pos. No. | | | | | | | | | | |
|---|---|---|---|---|---|---|---|---|---|---|---|
| | 8 | 9 | 12 | 16 | 24 | 40 | 41 | 50 | 42 | 44 | 46 | 47 |
| H2 | 19.10 | | 0.99 | 5.40 | 8.41 | 0.00 | | 0.00 | 0.00 | 0.00 | 0.00 | |
| H2O | 43.24 | | 49.34 | 40.52 | 7.42 | 1.90 | | 9.09 | 4.23 | 7.54 | 9.09 | |
| N2 | 0.06 | | 0.08 | 0.04 | 0.07 | 76.56 | | 65.19 | 72.87 | 54.03 | 65.19 | |

TABLE 2-continued

| Composition Mole % | Pos. No. | | | | | | | | | | | |
|---|---|---|---|---|---|---|---|---|---|---|---|---|
| | 8 | 9 | 12 | 16 | 24 | 40 | 41 | 50 | 42 | 44 | 46 | 47 |
| CO | 28.51 | | 0.03 | 3.39 | 5.27 | 0.00 | | 0.00 | 0.00 | 0.00 | 0.00 | |
| CO2 | 9.03 | | 33.70 | 50.65 | 78.83 | 0.03 | | 20.34 | 6.63 | 28.27 | 20.34 | |
| CH4 | 0.06 | | 15.36 | 0.00 | 0.00 | 0.00 | | 0.00 | 0.00 | 0.00 | 0.00 | |
| O2 | 0.00 | | 0.00 | 0.00 | 0.00 | 20.59 | | 4.59 | 15.40 | 9.51 | 4.59 | |
| AR | 0.00 | | 0.00 | 0.00 | 0.00 | 0.92 | | 0.78 | 0.88 | 0.65 | 0.78 | |
| Temp. Deg. C. | 350.00 | | 600.00 | 650.00 | 50.73 | 338.00 | | 570.00 | 421.12 | 570.35 | 650.00 | |
| Pres. Bar g | 25.00 | | 0.01 | 0.01 | 0.03 | 0.03 | | 0.01 | 0.02 | 0.02 | 0.01 | |
| Flow Nm3/h | 159. | | 122. | 216. | 139. | 250. | | 120. | 370. | 499. | 414. | |
| Duty kcal/h | | 54273 | | | | | | | | | | 3787 |
| Power W | | | | | | | 900 | | | | | |

As seen from the above computation model enlisted in Table 1 and Table 2, the flow rate in recycle line 50 of the cathode gas loop of the fuel cell power plant according to a preferred embodiment of the invention is reduced by a factor of about 15, and a factor of about 6 in supply line 42, resulting in diminished compression work by a factor about 5 as compared to a conventional hydrogen-carbon oxide employing fuel cell power plant as described in Example 1.

Having thus described the invention in detail with respect to a specific embodiment of the invention it is to be understood that various changes which will be readily apparent to those skilled in the art are contemplated as within the scope of the present invention, which is limited only by the following claims.

We claim:

1. A fuel cell power plant utilizing hydrogen and carbon oxide rich feed gas (4) and comprising a hydrogencarbon oxide consuming fuel cell (2) with an anode compartment (2a) and a cathode compartment (2c), means for supplying feed gas (8, 10 12) to the anode compartment (2a), compression means (41) for supplying the cathode compartment (2c) with compressed cathode oxidant gas (44), and means for recirculating fuel cell exhaust gas (46, 50, 42) to the cathode compartment (2c), which fuel cell power plant further comprises a methanation unit (9) for converting the hydrogen and carbon-oxide rich feed gas (4) into a methanated gas, a reforming catalyst bed (13) adapted to receive and reform the methanated gas to anode process gas (14) by absorbing waste heat from said fuel cell (2).

2. The fuel cell power plant of claim 1, wherein said methanation unit (9) comprises a boiling water methanation reactor.

3. The fuel cell power plant of claim 1, wherein said methanation unit (9) comprises one or more adiabatic methanation reactors.

4. The fuel cell power plant of claim 1, wherein said methanation unit (9) comprises an adiabatic methanation reactor and a boiling water methanation reactor.

5. The fuel cell power plant of claim 1, wherein said reforming catalyst bed (13) is an integrated part of the fuel cell (2).

6. The fuel cell power plant of claim 5, wherein said fuel cell (2) is a molten carbonate fuel cell.

7. The fuel cell power plant of claim 5, wherein said fuel cell (2) is a solid oxide fuel cell.

8. The fuel cell power plant of claim 1, wherein said means for recirculating fuel cell exhaust gas (46, 50, 42) includes an ejector (51) adapted to receive and circulate cathode exhaust gas and compressed air.

* * * * *